United States Patent [19]

Mohler et al.

[11] Patent Number: 5,161,083
[45] Date of Patent: Nov. 3, 1992

[54] SOLENOID ACTUATOR WITH POSITION FEEDBACK SYSTEM

[75] Inventors: David B. Mohler, Tipp City; Randy S. Robinson, Bradford, both of Ohio

[73] Assignee: Lucas Ledex Inc., Vandalia, Ohio

[21] Appl. No.: 756,537

[22] Filed: Sep. 9, 1991

[51] Int. Cl.⁵ .................... H01H 47/22; H01H 47/00
[52] U.S. Cl. ................. 361/143; 324/207.23
[58] Field of Search .......... 361/143, 152-154, 361/160, 170, 205; 307/140, 143; 335/17, 272; 340/644, 686, 687; 324/207.16, 207.34, 207.23, 207.25

[56] References Cited

U.S. PATENT DOCUMENTS

| | | | |
|---|---|---|---|
| 3,435,394 | 3/1969 | Egger | 335/272 |
| 4,663,589 | 5/1987 | Fiori, Jr. | 324/208 |
| 4,777,436 | 10/1988 | Fiori, Jr. | 324/208 |

Primary Examiner—A. D. Pellinen
Assistant Examiner—Aditya Krishnan
Attorney, Agent, or Firm—Nixon & Vanderhye

[57] ABSTRACT

Disclosed is an improved solenoid actuator utilizing an actuator position sensor which in combination with an actuator controller, adjusts the energizing current supplied to the actuator's coil. The adjustment is based upon any difference between an actual position of the actuator and a desired position of the actuator. If there is a difference, the controller changes the energization of the actuator's coil so as to actively move the actuator to the desired position. The improvement can be utilized with existing rotary and linear proportional actuators as well as any other solenoid-type actuator.

8 Claims, 3 Drawing Sheets

SOLENOID ACTUATOR WITH POSITION FEEDBACK SYSTEM

BACKGROUND OF THE INVENTION

1. Field of the Invention

The present invention relates generally to the field of solenoid actuators and more specifically to an improvement in positional accuracy for a solenoid actuator.

2. Discussion of Prior Art

Electrically operated solenoids are well known and comprise a slug of metal and an electrical coil whereby the metal moves into closer proximity to the flux field of the coil when the coil is electrically energized. Such solenoids have been utilized in many different applications for years.

More recently, there have been developments, such as rotary and linear proportional actuators, which permit rotary and linear operation at intermediate positions, i.e. positions between the coil's deenergized and completely energized position. Generally, such actuators utilize a spring of some sort to urge the actuators armature towards the deenergized position. In such devices, when the coil is only partially energized, the actuator moves part way between the deenergized position and the fully energized position. By controlling the energizing coil current, the position of the actuator can be changed.

FIGS. 1 and 2 illustrate a typical prior art rotary proportional actuator similar to that disclosed in U.S. Pat. No. 3,435,394 issued to Egger on Mar. 25, 1969. In FIG. 1, the armature 10 is mounted on output shaft 12 which in turn is mounted for rotation in bearings 14. An energizing coil 16 operates in conjunction with stators 18 such that when the coil is energized, an electromagnetic field is formed between the stators 18 in an axial direction. The armature 10 tends to move into the flux field created and, as shown in FIG. 2, would rotate in a counter clockwise direction when the energizing coil is supplied with current. Stop 20 serves to locate the armature position in the deenergized position and it is retained there by coil spring 22 (not shown in FIG. 2 for clarity of illustration).

The coil spring 22 continually urges the armature towards the deenergized position in contact with stop 20, but can be overcome by the torque applied to armature 10 through energization of the coil. It is beneficial to maintain a certain amount of overlap between armature 10 and stator 18 (in the vicinity of the lead line 10 in FIG. 2) to insure that upon coil energization the armature begins rotation in the proper direction.

Prior art solenoids, whether rotary or linear, which operate in intermediate positions, have a relatively "soft" feel at the intermediate position. This reason for this soft feel can perhaps be better understood by reference to diagram included as FIG. 3. FIG. 3 illustrates various positions of a rotary proportional actuator which rotates in a clockwise direction from the deenergized position on the left of the Figure towards the energized position on the right.

It can be seen that the spring torque tends to force the solenoid towards the deenergized position and the desired intermediate position is that position where the spring torque balances the electromagnetic torque from the coil's energization. Although illustrated as half way between the energized and deenergized position, the "desired" position could be anywhere between the deenergized and energized limits.

If the armature is manually deflected away from the desired position, a return force will be present tending to move the armature back to the desired position when the armature is released. If the deflection is towards the deenergized position, the armature movement is in the direction of the spring torque and thus the counter clockwise torque caused by the spring will be less. However, most actuators designed for intermediate operation (such as the rotary and linear proportional actuators) have a relatively uniform rotational torque created by the electromagnetic coil which does not vary significantly with the rotary position of the armature (within the normal limits of operation).

As a consequence, the only restoring force tending to move the armature from the deflected position back towards the desired position is the decrease in spring torque which does not now fully equal the electromagnetic torque of the actuator. Similarly, if the armature is deflected towards the energized position, the electromagnetic torque will not change but the restoring force caused by the spring will increase and, therefore, the difference in spring torque and the countering electromagnetic torque again will be the only restoring force.

The consequence of the above is that, in effect, there is only the change in spring torque caused by the rotation which serves to restore the armature to the desired position. This relatively weak restoring force results in a actuator which has a relatively "soft" feel to it. Where an actuator operates in a high vibration environment or where there are external loads applied to the output shaft (by a valve or other structure being controlled by the actuator), it is desirable to increase the restoring torque available in such an actuator. It would also be desirable to be able to command the actuator to a specific predetermined position and have the actuator move to that exact position.

SUMMARY OF THE INVENTION

It is, therefore, an object of the present invention to provide an improved solenoid actuator which has a greater effective restoring force without an increase in spring or coil sizes.

It is a further object of the present invention to provide a means for accurately positioning the armature of a solenoid actuator at a desired position.

It is a still further object of the present invention to provide a compact rotary proportional actuator with an enhanced restoring force as well as the ability to provide precise precision control.

The above and other objects are achieved in accordance with the present invention by providing a position sensor in combination with the solenoid actuator. The actual position, as sensed by the position sensor, is supplied to an actuator controller and compared with a desired position. If there is a difference, the coil current is increased or decreased by the actuator controller as necessary to move back the actuator to the desired position.

In a preferred embodiment of the present invention, a rotary proportional actuator includes a Rotary Variable Inductance Transducer (RVIT) which provides an extremely accurate output indication of the actual position of the rotary proportional actuator output shaft. The actuator controller compares the actual position with a desired position, derives an error signal and uses the error signal to increase or decrease the duty cycle of the coil energizing current until the armature moves to the desired position.

BRIEF DESCRIPTION OF THE DRAWINGS

The operation and benefits of the invention will be better understood by reference to the following drawings, wherein.

DETAILED DESCRIPTION OF PREFERRED EMBODIMENTS

Figure 5:
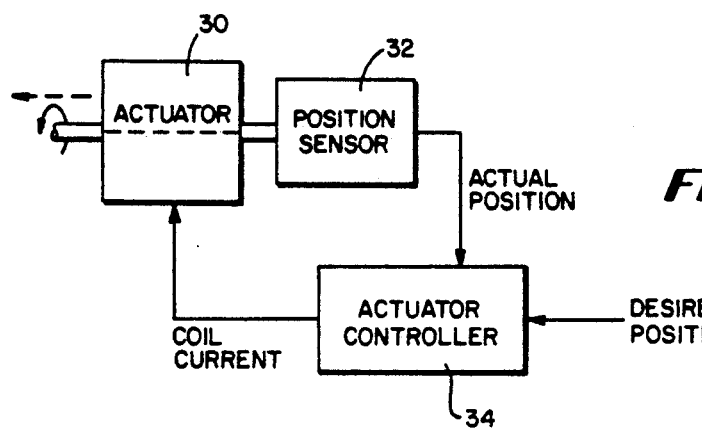
FIG. 5 is a block diagram illustrating the interrelationship of the actuator, the position sensor and other elements in accordance with the present invention for both a rotary and linear solenoid actuator.

FIG. 5 is a block diagram illustrating the present invention. Actuator 30 can be either a rotary actuator (with a shaft output in a rotational direction as indicated by the solid line arrow) or a linear actuator (with a shaft output in the linear direction as indicated by the dashed line arrow).

Mechanically coupled with the actuator is a position sensor 32 which provides an actual position output to the actuator controller 34. The position sensor 32 can be any one of a multitude of position sensing devices including, but not limited to, electromagnetic, electrostatic, optical, Hall-effect, etc. The actuator controller 34 has as a second input the desired position for the actuator 30. The controller develops an error signal and uses the error signal to increase or decrease the effective coil current applied to the actuator.

Figure 1:
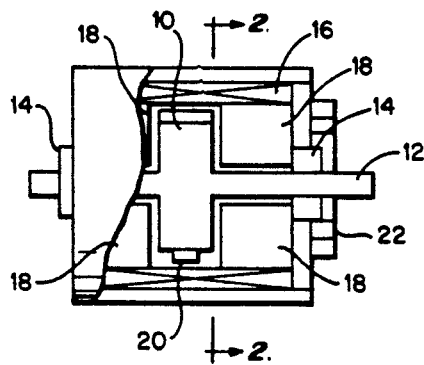
FIG. 1 is a side view partially in section of the prior art rotary proportional actuator.
Figure 3:
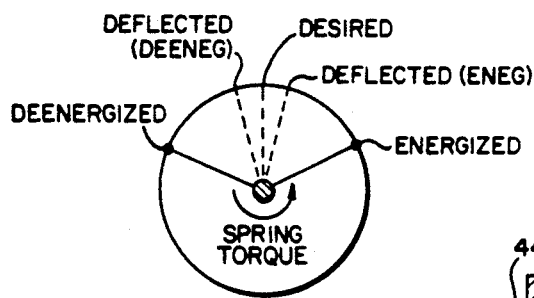
FIG. 3 is a diagram illustrating movement between deenergized and energized positions for a rotary proportional actuator.

The consequence and benefit of the use of a position sensor and actuator controller can be better understood by again referring to FIG. 3. Like the prior art rotary proportional actuator of FIG. 1, the device of FIG. 5 (in its rotary embodiment) will go to the desired position when energized. However, when deflected away from the desired position (towards the deenergized position), not only does the slight reduction in spring torque comprise a restoring force (it will be recalled that this was the sole restoring force in the prior art embodiments) but the actual position sensed by the position sensor will be different from the desired position.

As a result of the error signal developed, the actuator controller will increase the effective coil current so as to increase the electromagnetically induced torque and adding a further component to the restoring force. Thus, the restoring force will be the combination of the excess electromagnetic torque (as a result of the decrease in spring torque) and the increase in electromagnetic torque as governed by the actuator controller. In operation, a much greater restoring force will be present for a given amount of deflection (without any increase in the stiffness of the return spring or the size of the energizing coil). Said another way, for equal restoring forces to be generated, significantly less rotational deviation is required by the FIG. 5 embodiment. This can be felt during operation as a "harder" feel to the improved rotary proportional actuator in its desired position rather than the "soft" feel of a prior art rotary proportional actuator.

Converse to the condition in which the actuator is deflected towards the deenergized position by some outside influence is the situation wherein the actuator, having been electrically positioned to some intermediate position, is externally deflected towards the energized position. Now the restoring forces are comprised of a slight increase in the torque of the return spring as a result of movement and the sensor, having sensed the change in position, causes a decrease in current to the actuator resulting in a reduction of electromagnetic torque. Thus, the restoring force will be the combination of increased spring torque and a reduction of electromagnetic torque both of which contribute to restoring the armature to the original position.

Figure 4:
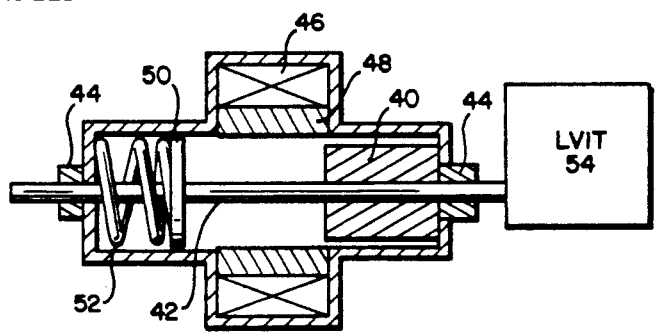
FIG. 4 is a side cross sectional view of an improved linear proportional actuator in accordance with the present invention.

FIG. 4 illustrates a simple linear embodiment of the actuator and position sensor combination of FIG. 5. An armature 40 is mounted on shaft 42 which in turn is mounted for linear movement along the axis of the shaft through sleeve bearings 44. Coil 46, when energized, generates an electromagnetic flux flowing through stator 48. Spring stop 50 is connected to shaft 42 and serves to compress spring 52 when armature 40 moves in the output shaft's longitudinal direction. The position sensor in this embodiment is linear variable inductance transducer (LVIT) 54 which provides an output of the actual position of armature 40 between its deenergized position (as shown) and its energized position (in proximity with stator 48).

Figure 2:
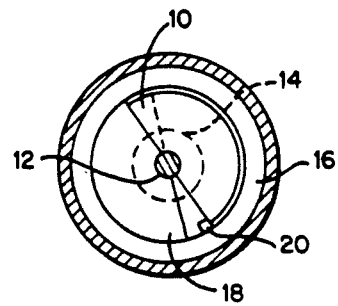
FIG. 2 is a cross section of the rotary proportional actuator illustrated in FIG. 1.
Figure 6:
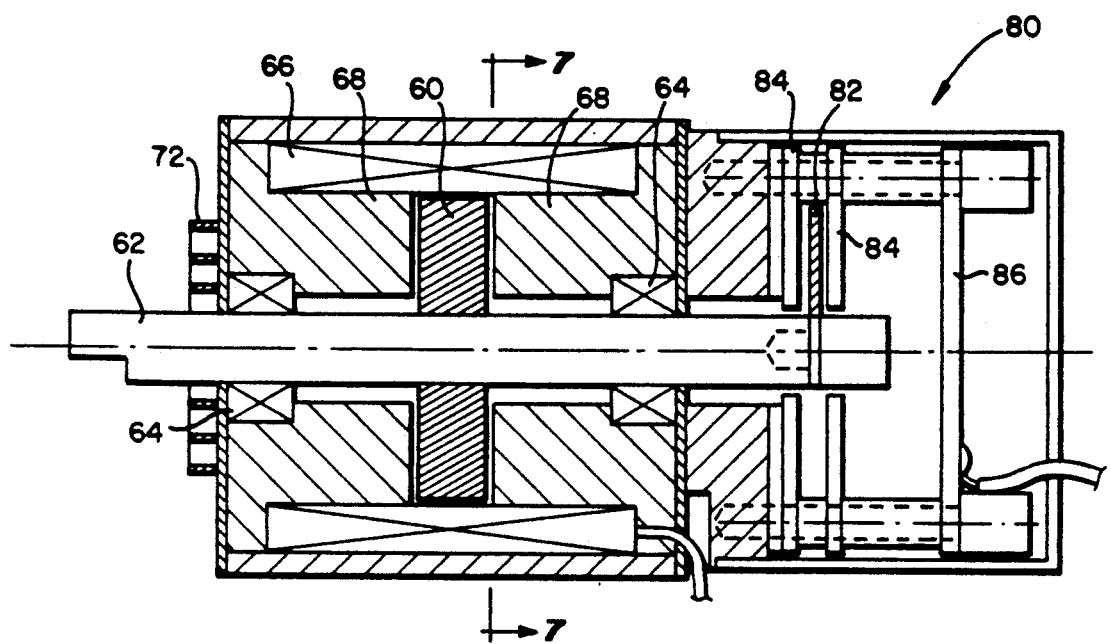
FIG. 6 is a side sectional view of a rotary proportional actuator combined with a rotary variable inductance transducer in accordance with the present invention.
Figure 7:
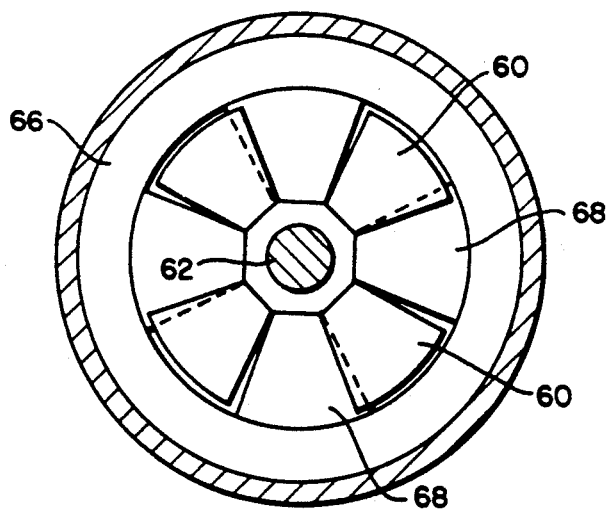
FIG. 7 is a cross-sectional view the rotary proportional actuator of FIG. 6 illustrating a four lobe armature.

FIGS. 6 and 7 illustrate an embodiment of the present invention with respect to rotary operation. A rotary proportional actuator is combined with a rotary variable inductance transducer (RVIT) and is connected with an actuator controller (not shown) as suggested in FIG. 5. Armature 60 is a four lobed armature which provides higher rotating torque than a one or two lobed embodiment but at a cost of a smaller angular operational range. The four lobed embodiment of FIG. 7 has an effective range of from deenergized to energized of about 35°. The rotary proportional actuator illustrated in FIGS. 1 and 2 would have an effective range of approximately 165°. Depending upon the application and a desired rotational range, a single or multiple lobe rotary proportional actuator could be utilized.

The armature 60 is connected to the output shaft 62 which is mounted for only rotation in bearings 64. Coil 66 when energized, creates a magnetic flux field through stators 68 causing the armature to rotate into a position in line with the stators upon full energization of the coil. Return spring 72 serves to urge the shaft towards the deenergized position. The RVIT 80 is also shown in FIG. 6 and includes a spoiler 82 which is fixed to shaft 62 such that it rotates with armature 60. The spoiler moves into and out of juxtaposition with position sensing coils (not shown) located on substrates 84 which are electrically connected to printed circuit board 86 which electronically processes the information to provide a position output signal.

The rotary variable inductance transducer is well known to those of ordinary skill in the art and embodiments are discussed in U.S. Pat. No. 4,777,436 which issued Oct. 11, 1988. The electronic processing circuitry for processing the electronic information from such a transducer which could be included in printed circuit board 86 is disclosed in U.S. Pat. No. 4,642,555 issued to Swartz et al on Feb. 10, 1987 and U.S. Pat. No. 4,663,589 issued May 5, 1987. The subject matter of all of the above cited patents is herein incorporated by reference.

Figure 8:
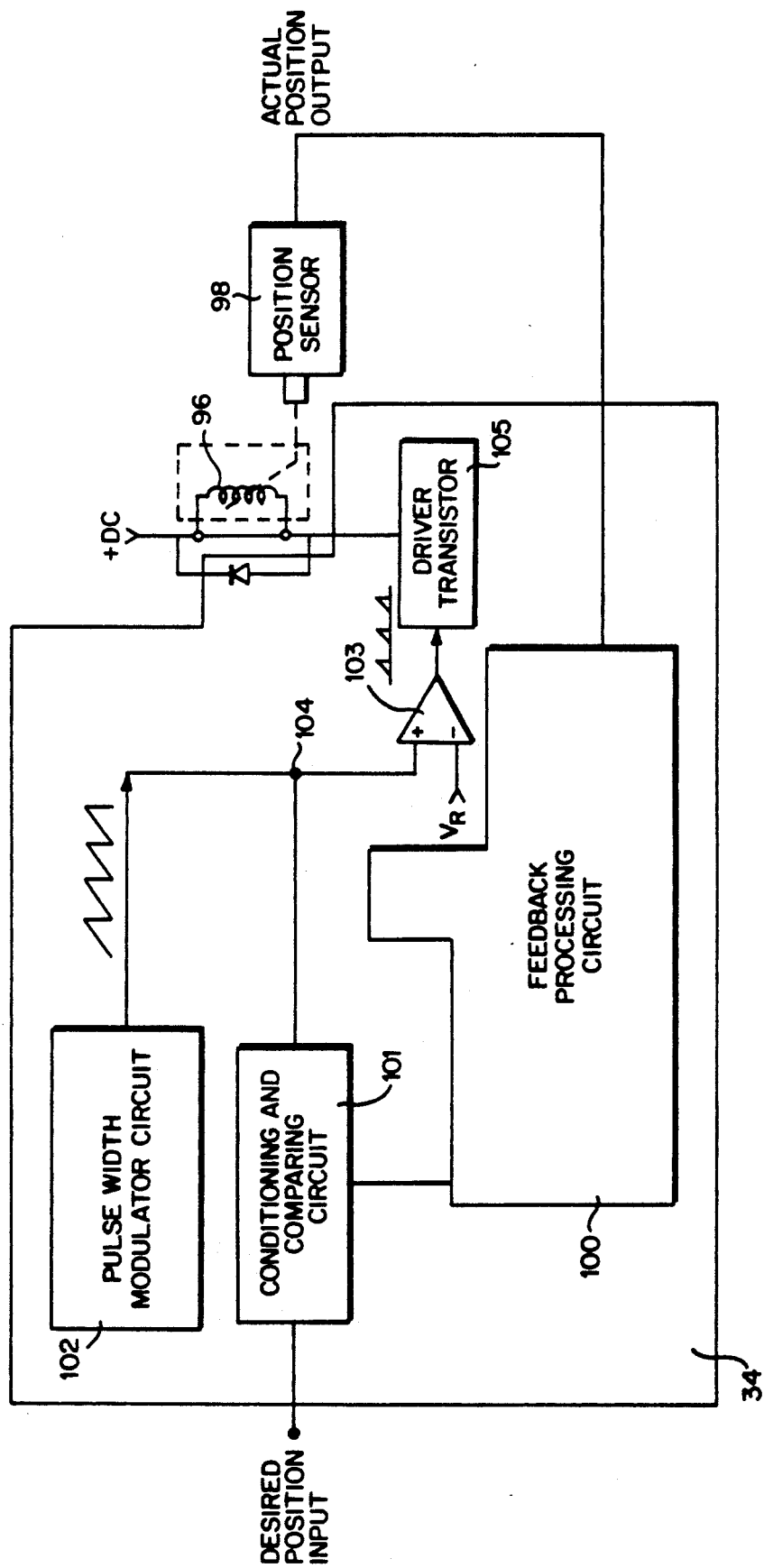
FIG. 8 is an electrical block diagram of the actuator controller illustrating one embodiment of an actuator controller and its interconnection with the position sensor and actuator.

FIG. 8 illustrates one embodiment of the actuator controller which could be utilized for either a rotary proportional actuator or a linear proportional actuator. The actuator coil 96, as previously illustrated in FIG. 5, is mechanically linked to the position sensor 98. Position sensor 98 provides an actual position output to the actuator controller 34 and, in particular, to feedback processing circuit 100. $V_c$ represents in a preferred embodiment a regulated ten volt power supply input with and $V_r$ represents a regulated voltage of five volts. A voltage divider supplies a variable reference voltage to the operational amplifier in the feedback processing circuit so as to establish a center position for the actuator coil.

The pulse width modulator circuit 102 provides a variable frequency sawtooth output signal. The desired position input signal, after processing through operational amplifiers and conditioning the signal for span of input and threshold set in the conditioning and comparing circuit 101, is compared with the actual position output from the position sensor in an operational amplifier. The output of circuit 101 is a threshold level which increases or decreases depending upon the error between the desired position input and the actual position output which is fed back by way of the feedback processing circuit 100.

The two signals are combined at junction 104 and the resultant sawtooth signal is applied to one input of the output comparator 102. Inasmuch as the other output of the comparator is a reference voltage, the output will be indicative of that portion of the time in which the sawtooth signal exceeds the reference voltage. If the threshold is high and thus the sawtooth is biased in the positive direction, then the comparator will provide an output for a high percentage of the time (effectively a high duty cycle or energization duration). However, if the threshold is relatively low, only the peaks of the sawtooth signal will exceed the reference voltage and cause the comparator to provide an output (a low duty cycle or energization duration) applied to the driver transistor 105 controlling current flow through actuator coil 96.

Quite obviously, many modifications and variations of the circuit shown in FIG. 8 could be utilized as an actuator controller. Digital inputs could be processed by a digital-to-analog converter and utilized in an analog embodiment. Rather than a pulse width modulated output, a lower level variable DC voltage could be applied directly to coil 96. The position sensor could utilize an optical feedback system which may be more desirable in some circumstances.

In view of the above disclosure, many benefits of the improved solenoid actuator can be seen. Since the actuator is actively controlled to the desired position (instead of passively under the influence of the change in spring torque only), it will move greater loads to the desired position, i.e. operate a stiffer valve, overcome higher frictional loads, etc. As also desired, it will be able to quickly move to a predetermined position and will return to that predetermined position with great regularity and accuracy when required.

The rotary torque actuator can provide a viable alternative to stepper motors currently used in a number of applications. A stepper motor generally utilizes multiple coils and operates in only 1 to 3° per step requiring multiple "steps" to obtain a desired position. The improved solenoid actuator can move to the desired position in one "step" and does so with only a single coil.

In a preferred embodiment, as illustrated in FIG. 6, the position sensor utilizes the same output shaft as does the solenoid actuator eliminating the otherwise necessary mechanical interconnections and additional bearing systems for positioning the spoiler plate for the desired operation.

Additional applications of such linear or rotary proportional actuators could be fuel racks for diesel engines in which the fuel flow is very precisely controlled by utilizing an improved actuator to control a fuel flow valve. An improved rotary or linear actuator could be utilized in the injector timing system in which the combination accurately meters the amount of fuel injected into a diesel engine and/or controls the timing of the injection into the diesel engine. There are a number of applications in the aviation industry for controlling hydraulic and/or pneumatic valve positions for the operation of aircraft flight and other control systems.

In accordance with the above teachings many other modifications and derivations of the present invention will be obvious to those of ordinary skill. Therefore, the invention is not limited by the embodiments previously discussed and submitted herewith by way of example, but rather are limited only by the claims appended hereto.

What is claimed is:

1. An independent solenoid actuator, said actuator comprising:
   a stator including an energizing coil;
   an armature;
   means mounting said armature for movement between an energized coil position and a deenergized coil position;
   means for urging said armature towards said deenergized position;
   means for sensing actual position of said armature; and
   means, responsive to said sensing means, for comparing said actual position with a desired position and for controlling energization of said coil to urge said armature towards said desired position.

2. An improved linear proportional actuator comprising:
   a stator including an energizing coil;
   an armature;
   means mounting said armature for linear movement between a deenergized coil position and an energized coil position;
   spring means for urging said armature towards said deenergized coil position;
   means for sensing an actual linear position of said armature; and
   means, responsive to said sensing means, for comparing said actual linear position with a desired linear position and for controlling energization of said energizing coil to urge said armature towards said desired linear position.

3. An improved rotary proportional actuator comprising:
   a stator including an energizing coil;
   an armature;
   means for mounting said armature for rotation between a deenergized coil position and an energized coil position;
   spring means for urging said armature towards said deenergized coil position;
   means for sensing actual rotational position of said armature and providing an output signal indicative of said position; and
   means, responsive to said sensing means, for comparing said actual position with a desired rotational position and for controlling energization of said energizing coil to urge said armature towards said desired rotational position.

4. The improved rotary proportional actuator according to claim 3, wherein said means for mounting said armature comprise:
   a shaft upon which said armature is mounted; and
   bearing means, fixed in relation to said stator and displaced along said shaft, for permitting rotation of said shaft.

5. The improved rotary proportional actuator according to claim 3, wherein said spring means comprises a return spring with one end fixed to said stator and another end fixed to said armature.

6. The improved rotary proportional actuator according to claim 3, wherein said means for sensing actual rotational position comprises a rotary variable inductance transducer.

7. The improved rotary proportional actuator according to claim 6, wherein said rotary variable inductance transducer includes:
   at least one planar coil mounted in a fixed relationship with said stator;
   spoiler plate means, mounted for rotation with said armature, for changing inductance of said at least one planar coil during rotation; and
   circuitry means for providing an output signal in response to changes in inductance of said at least one planar coil.

8. An improved rotary proportional actuator comprising:
   a stator including an energizing coil;
   an armature;
   means for mounting said armature for rotation between a deenergized coil position and an energized coil position, said mounting means comprising:
      a shaft upon which said armature is mounted; and
      bearing means, fixed in relation to said stator and displaced along said shaft, for permitting rotation of said shaft;
   spring means for urging said armature towards said deenergized coil position, wherein said spring means comprises a return spring with one end fixed to said stator and another end fixed to said armature;
   means for sensing actual rotational position of said armature and providing an output signal indicative of said position, wherein said means for sensing actual rotational position comprises a rotary variable inductance transducer, said rotary variable inductance transducer includes:
      at least one planar coil mounted in a fixed relationship with said stator;
      spoiler plate means, mounted for rotation with said armature, for changing inductance of said at least one planar coil during rotation; and
      circuitry means for providing an output signal in response to changes in inductance of said at least one planar coil; and
   means, responsive to said sensing means, for comparing said actual position with a desired rotational position and for controlling energization of said energizing coil to urge said armature towards said desired rotational position.

* * * * *